US012694115B2

(12) United States Patent
Shetty et al.

(10) Patent No.: US 12,694,115 B2
(45) Date of Patent: Jul. 28, 2026

(54) PATCHING ENDPOINTS IN AN ISOLATED, AIR-GAPPED ENVIRONMENT

(71) Applicant: Kyndryl, Inc., New York, NY (US)

(72) Inventors: Shodhan Shetty, Udupi (IN); Virginia Mayo, Jersey City, NJ (US); Cindy J. Mullen, Madison, WI (US)

(73) Assignee: Kyndryl, Inc., New York, NY (US)

( * ) Notice: Subject to any disclaimer, the term of this patent is extended or adjusted under 35 U.S.C. 154(b) by 50 days.

(21) Appl. No.: 18/791,528

(22) Filed: Aug. 1, 2024

(65) Prior Publication Data

US 2026/0037633 A1 Feb. 5, 2026

(51) Int. Cl.
*G06F 21/57* (2013.01)
*G06F 21/53* (2013.01)
*H04L 9/40* (2022.01)

(52) U.S. Cl.
CPC .............. *G06F 21/57* (2013.01); *G06F 21/53* (2013.01); *H04L 63/0263* (2013.01); *G06F 2221/033* (2013.01)

(58) Field of Classification Search
CPC ..................... G06F 21/57; G06F 21/53; G06F 2009/45587; H04L 63/0281
See application file for complete search history.

(56) References Cited

U.S. PATENT DOCUMENTS

| | | |
|---|---|---|
| 8,078,688 B2 | 12/2011 | Ansari et al. |
| 8,171,483 B2 | 5/2012 | Nord et al. |
| 10,853,056 B2 | 12/2020 | Islam et al. |
| 11,341,245 B1 * | 5/2022 | Voss .................... G06F 11/2094 |
| 11,762,650 B1 * | 9/2023 | Castagna .................. G06F 8/65 717/168 |
| 2011/0289495 A1 * | 11/2011 | Mulligan .................. G06F 8/61 717/168 |
| 2014/0331297 A1 * | 11/2014 | Innes .................. H04L 63/0884 726/7 |
| 2015/0193637 A1 * | 7/2015 | Booth ..................... G06F 21/53 726/30 |
| 2018/0213002 A1 * | 7/2018 | Figovsky ................ G06F 21/53 |
| 2023/0017989 A1 * | 1/2023 | Shi ......................... G06F 21/566 |
| 2023/0396590 A1 | 12/2023 | Adogla |

FOREIGN PATENT DOCUMENTS

| | | | | |
|---|---|---|---|---|
| CN | 107329735 | | 11/2017 | |
| CN | 107329735 A | * | 11/2017 | ............. G06F 21/57 |
| CN | 115296940 | | 11/2022 | |
| WO | WO-2006012014 A2 | * | 2/2006 | ........... G06F 21/604 |

OTHER PUBLICATIONS

Keso, "Unidirectional patch management solution to isolated network," https://www.theseus.fi/bitstream/handle/10024/156788/Keso_Teemu_YAMK.pdf?sequence=1, Oct. 17, 2018, 60 pages.

* cited by examiner

*Primary Examiner* — Hee Soo Kim

(74) *Attorney, Agent, or Firm* — Erik Swanson; Andrew D. Wright; Calderon Safran & Wright P.C.

(57) ABSTRACT

A computer-implemented method may include querying a centralized patch repository for new patch data; receiving a confirmation that there is new patch data in the centralized patch repository; spinning-up a proxy in an isolated computing environment in response to the receiving the confirmation; disabling an air-gap of the isolated computing environment configured to receive the new patch data; and receiving the new patch data at the isolated computing environment from the centralized patch repository.

20 Claims, 7 Drawing Sheets

700

702 — Query a centralized patch repository for new patch data

704 — Receive a confirmation that there is new patch data in the central patch repository 706 — Spin-up a proxy in an isolated computing environment in response to the receiving the confirmation 708 — Disable an air-gap of the isolated computing environment configured to receive the new patch data 710 — Receive the new patch data at the isolated computing environment rom the centralized patch repository

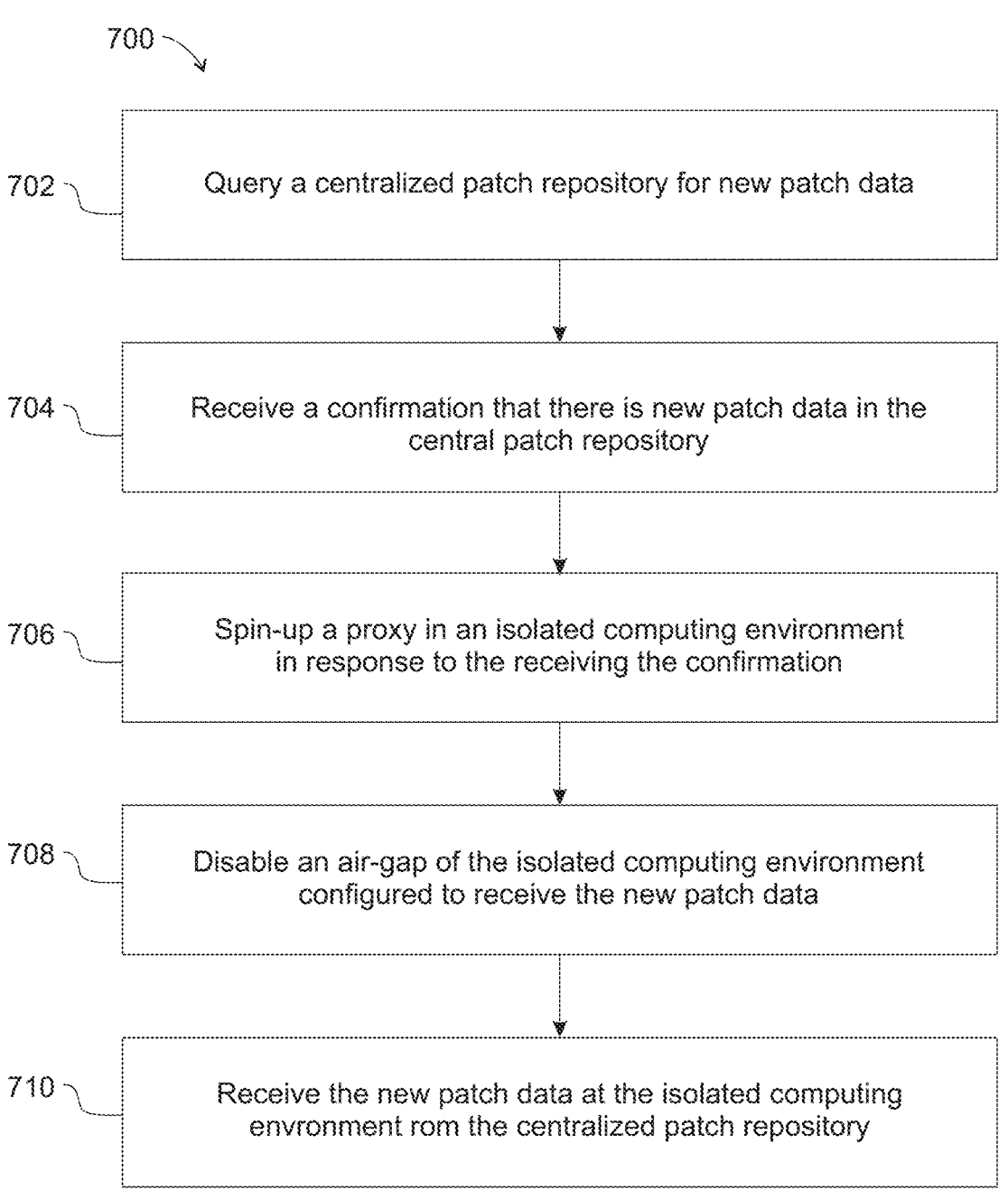

700

702 — Query a centralized patch repository for new patch data

704 — Receive a confirmation that there is new patch data in the central patch repository 706 — Spin-up a proxy in an isolated computing environment in response to the receiving the confirmation 708 — Disable an air-gap of the isolated computing environment configured to receive the new patch data 710 — Receive the new patch data at the isolated computing envronment rom the centralized patch repository

FIG. 7

PATCHING ENDPOINTS IN AN ISOLATED, AIR-GAPPED ENVIRONMENT

BACKGROUND

Aspects of the present invention relate generally to a private network in an air-gapped mode, and more particularly, to enabling and disabling proxy servers on an air-gapped private network to enable secure patching.

Cyber recovery solutions may be implemented in networked systems to provide security fixes and updates to software programs on a routine basis and provide data backup and recovery methods.

SUMMARY

In a first aspect of the present invention, there is a computer-implemented method including: querying a centralized patch repository for new patch data; receiving a confirmation that there is new patch data in the centralized patch repository; spinning-up a proxy in an isolated computing environment in response to the receiving the confirmation; disabling an air-gap of the isolated computing environment configured to receive the new patch data; and receiving the new patch data at the isolated computing environment from the centralized patch repository.

In another aspect of the present invention, there is a computer program product including one or more computer readable storage media having program instructions collectively stored on the one or more computer readable storage media. The program instructions are executable to: query a centralized patch repository for new patch data; receive a confirmation that there is new patch data in the centralized patch repository; spin-up a proxy in an isolated computing environment in response to the receiving the confirmation; disable an air-gap of the isolated computing environment configured to receive the new patch data; and receive the new patch data at the isolated computing environment from the centralized patch repository.

In another aspect of the present invention, there is system including a processor, a computer readable memory, one or more computer readable storage media, and program instructions collectively stored on the one or more computer readable storage media. The program instructions are executable to: query a centralized patch repository for new patch data; receive a confirmation that there is new patch data in the centralized patch repository; spin-up a proxy in an isolated computing environment in response to the receiving the confirmation; disable an air-gap of the isolated computing environment configured to receive the new patch data; and receive the new patch data at the isolated computing environment from the centralized patch repository.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 7 shows a flowchart of an exemplary environment in accordance with aspects of the present invention.

DETAILED DESCRIPTION

Figure 1:
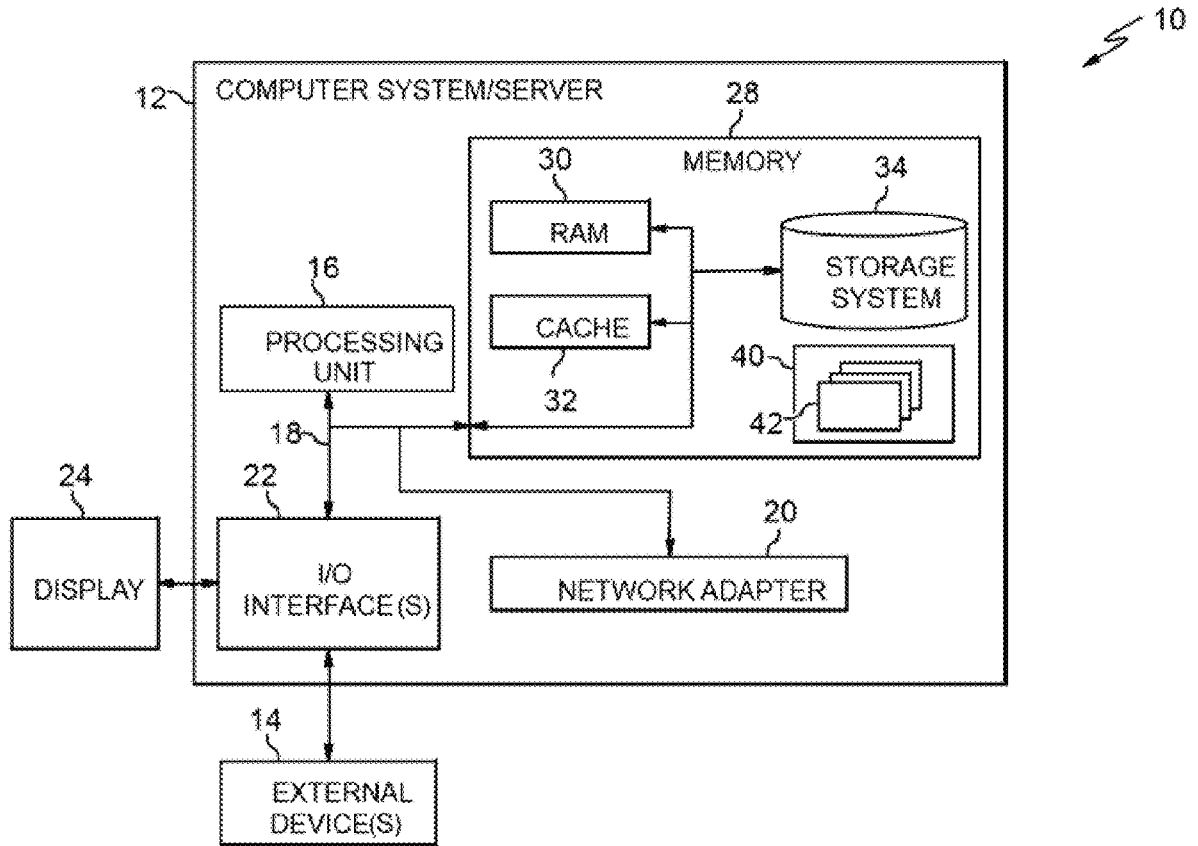
FIG. 1 depicts a cloud computing node according to an embodiment of the present invention.

Aspects of the present invention generally relate to systems, methods, and computer program products for securely enabling security patching in an air-gapped environment with minimum impact to isolated patching endpoints. More particularly, aspects of the present invention relate to enabling secure patching in an air-gapped environment with minimum impact to the isolation of the environment. According to aspects of the present invention, deploying proxies, e.g., proxy servers or proxy repositories, for patching in an isolated site may include dedicated private interfaces to connect proxies to a centralized patching repository. In embodiments, aspects of the present invention may include a private interface for proxies in operable communication with respective solution components such as proxy tools, i.e., interfacing computers, servers, and networks. According to aspects of the present invention, proxies within an isolated network environment may be deployed on network subnets or segments on which gateway firewalls are defined to allow network communication with centralized patch repositories. In embodiments, gateway firewall rules may block network communication with external repositories in response to the air-gap being enabled, thereby providing an isolated or air-gapped arrangement. Gateway firewall rules may be hardware or software-based, such as in on-premises deployments of the present invention. Gateway firewall rules may be network firewall or virtual firewall rules, such as in a cloud-based deployment of the present invention. Enabling the air-gap may be achieved manually or automatically via an automated air-gap module configured to manage firewall rules. The duration during which the air-gap remains disabled for synchronizing the repositories may be a configurable parameter. In embodiments, the air-gapped module may enable/disable the air-gap based on patching frequency, cycles, or requirements including automatically enabling/disabling gateway firewall policies. A disabled air-gap may allow trusted internet protocols (IPs) and ports to connect to relevant external patch repositories. In this manner, implementations of the present invention provide a system, method, and computer program product configured for maintaining an isolated environment while continuing to keep solution components compliant with security fixes and updates.

In embodiments, the air-gap module may disable the air-gap, i.e., implement gateway firewall rules that allow trusted IPs and ports to connect to external patch repositories in response to detecting new patches. In embodiments, the air-gap module may spin-up or spin-down, proxies in an isolated environment, disable the air-gap, and download synchronized patch data to the proxies. Spinning-up a proxy may include powering on or enabling the proxy in an isolated environment. Spinning-down a proxy may include powering off or disabling the proxy in an isolated environment. In embodiments, proxies may be idled or powered off in response to enabling the air-gap. In a cloud environment, connections from proxies to external patch repositories remain air-gapped unless the air-gap module determines that the connection is required to download or synchronize patch data. In embodiments, the air-gap module may query an external patch repository for new patch data prior to disabling the air-gap. In a local, on-premises environment, connections between proxies to on-premises patch repositories remain air-gapped unless the air-gap module determines that the connection is required to transfer or synchronize patch data. In embodiments, the air-gap module may query a local patch repository for new patch data prior to disabling the air-gap. In response to the query returning the availability of new patch data, the air-gap module may automatically trigger disabling of the air-gap. In embodiments, the air-gap module may verify the download or synchronization as successful before re-enabling the air-gap, i.e., enabling gateway firewall rules to prevent trusted IPs and ports from connecting to external patch repositories.

Cyber recovery solution components may be patched to adhere to the latest compliance controls. In an isolated environment, it may be difficult to maintain an air-gap to infrastructure services (e.g., patching services) that may need to access external vendor repositories to retrieve the latest patches and apply them on end points. e.g., a software application operating on a computing device, computing device infrastructure, or a computing device itself. An isolated computing environment may be maintained with updated security fixes and updates through an isolated cyber recovery solution. Conventional approaches may isolate a portion of the system from production, but fail to completely isolate the cyber recovery environment from the backend infrastructure, such as backend patching systems. Cyber recovery solutions may be used to minimize the impacts of cyber and ransomware attacks by providing the ability to recover clean copies of critical data assets as soon as possible. "Trusted copies" of backups isolated from the rest of the production assets may be kept as a last validated copy to restore data in case of cyber or ransomware attacks. Cyber recovery solutions may include the infrastructure necessary to ensure that the trusted copy is secure, immutable, isolated, and available when needed to be restored. Cyber solution components may require that there be no internet connectivity to avoid any attacks on a trusted copy from the public domain. Aspects of the present invention overcome shortcomings of conventional cyber recovery solutions by automatically air-gapping environments from external repositories during fixes and updates, thereby isolating the cyber recovery environment from the backend infrastructure and ensuring that trusted copies are secure, immutable, isolated, and available when needed to be restored.

Implementations of the present invention involve the technical field of cyber recovery solutions in computer systems, methods, and products that communicate data over networks, and therefore are necessarily rooted in computer technology. For example, the steps of querying, by a computing device, a centralized patch repository for new patch data; receiving, by the computing device, a confirmation that there is new patch data in the centralized patch repository; spinning-up, by the computing device, a proxy in an isolated computing environment in response to the receiving the confirmation; disabling, by the computing device, an air-gap of the isolated computing environment configured to receive the new patch data; and receiving, by the computing device, the new patch data from the centralized patch repository are computer-based and cannot be performed in the human mind. Implementations of the present invention involve the technical field of cyber recovery solutions in computer systems, methods, and products. Accordingly, the present invention amounts to more than merely implementing a generic computer as a tool to gather, analyze, and output data. In particular, the speed at which the communication of data, including cyber recovery solutions, program updates, and security fixes, must be accomplished in order to effectuate the disclosed method, system, or computer program product would involve large-scale, continuous monitoring and network-based communication (wired or wireless) of data. These features would be impossible to accomplish on pen and paper and cannot be accomplished as a method of organizing human activity or any other abstract idea.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
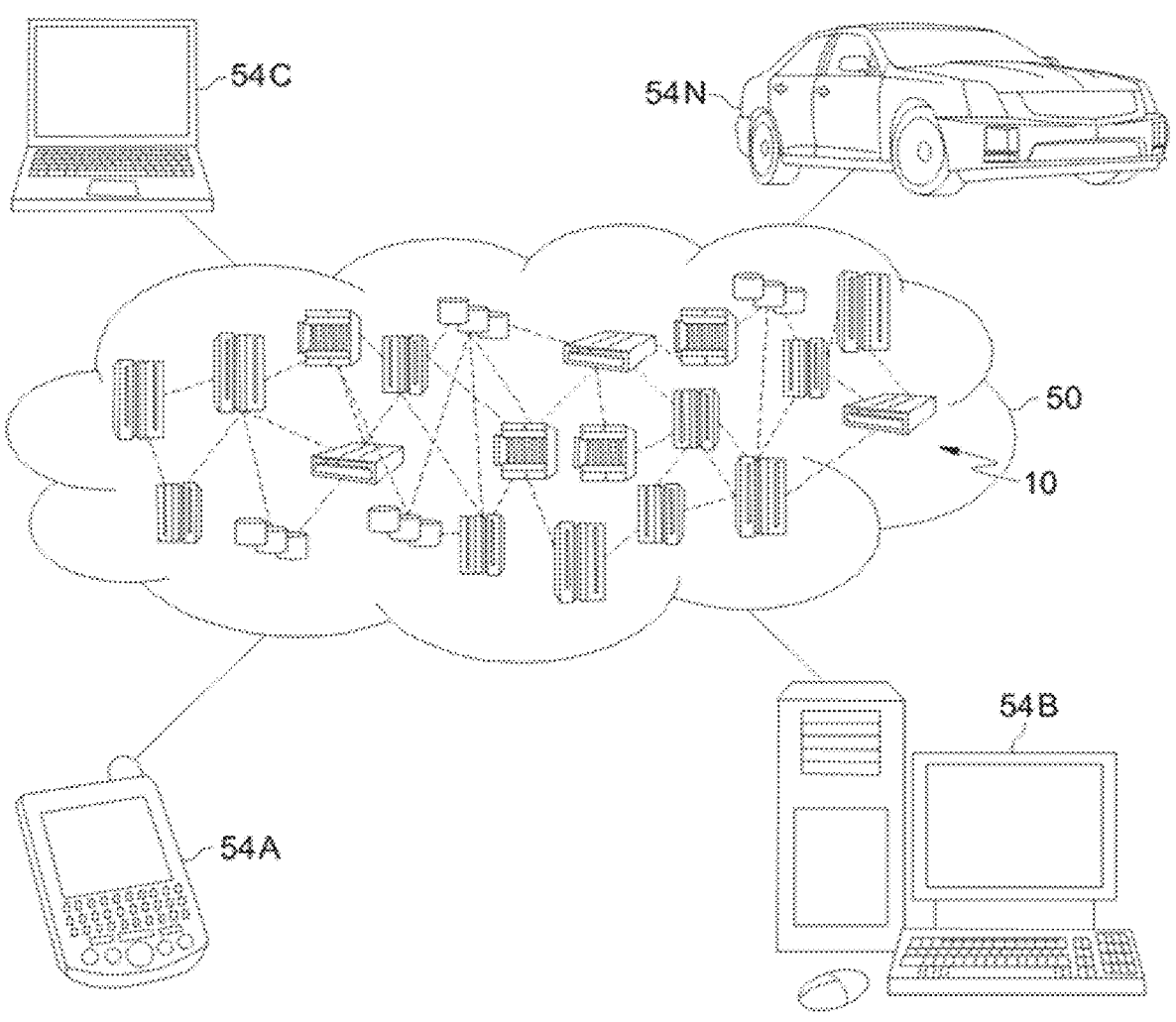
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
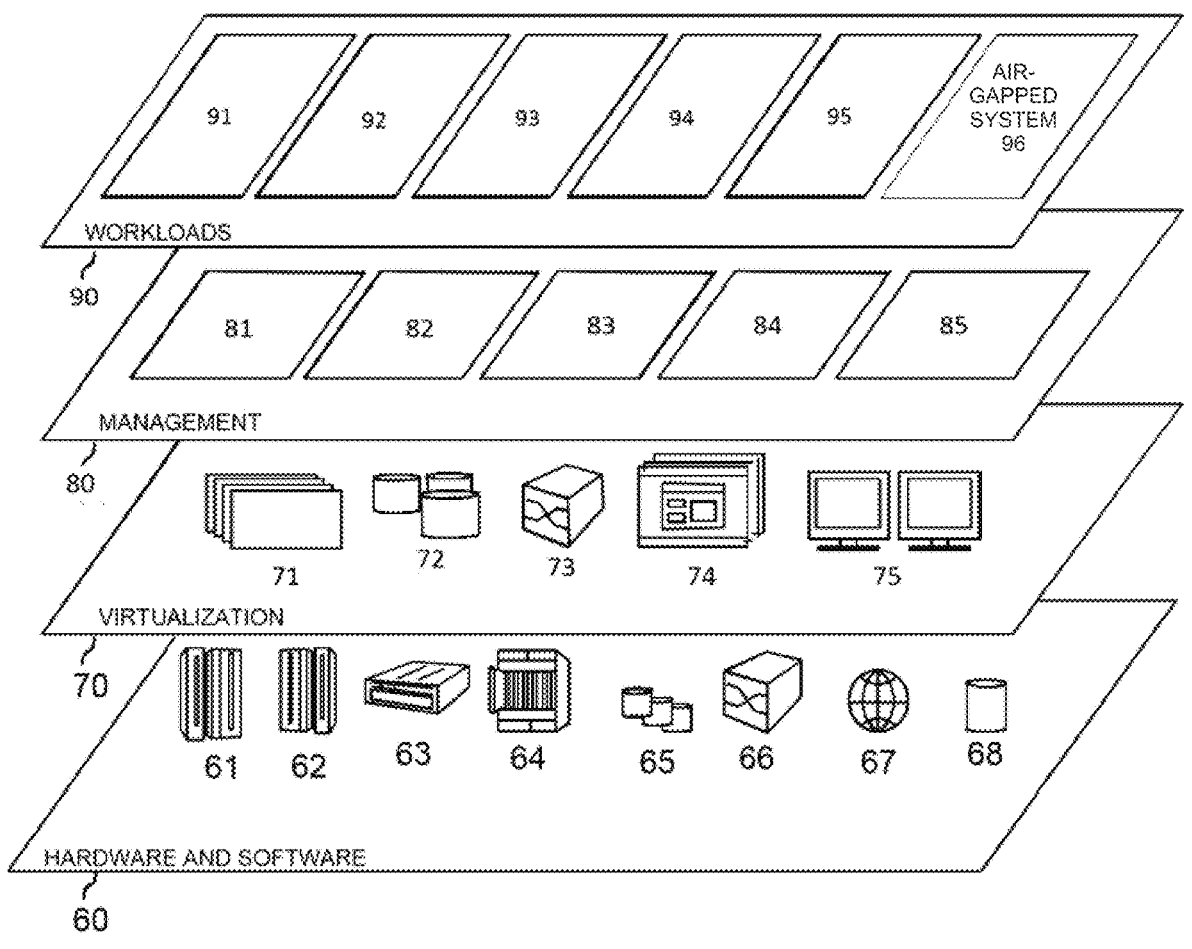
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and air-gapped system 96.

Implementations of the present invention may include a computer system/server 12 of FIG. 1 in which one or more of the program modules 42 are configured to perform (or cause the computer system/server 12 to perform) one of more functions of the air-gapped system 96 of FIG. 3. For example, the one or more of the program modules 42 may be configured to: query a centralized patch repository for new patch data; receive a confirmation that there is new patch data in the centralized patch repository; spin-up a proxy in an isolated computing environment in response to the receiving the confirmation; disable an air-gap of the isolated computing environment configured to receive the new patch data; receive the new patch data at the isolated computing environment from the centralized patch repository to the proxy; query the centralized patch repository for success criteria of the downloading; and enable the air-gap based on the success criteria.

Figure 4:
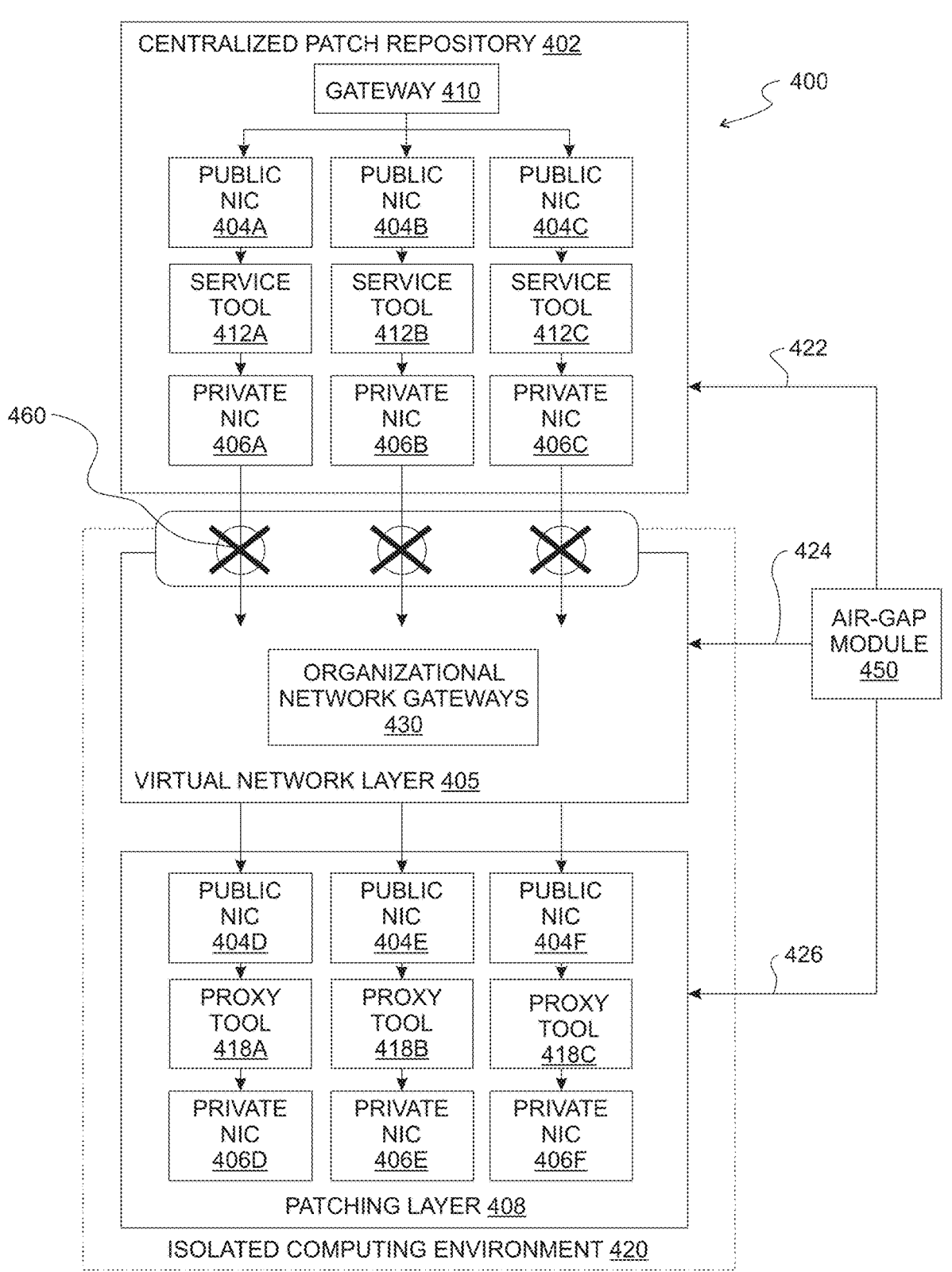
FIG. 4 shows a block diagram of an exemplary environment in accordance with aspects of the present invention.

FIG. 4 shows a block diagram of an exemplary environment 400 in accordance with aspects of the present invention in which an air-gap is enabled. The exemplary environment 400 may be a cloud-based environment or an on-premises environment, such as a data center including servers, data storage, and supporting infrastructure. In embodiments, enabling the air-gap comprises implementing firewall rules configured to block network communication with the centralized patch repository 402. In embodiments, environment 400 includes a centralized patch repository 402 in operable communication with an isolated computing environment 420. The centralized patch repository 402 may be an external repository, such as in a cloud-based environment, or a local repository, such as in an on-premises environment. The centralized patch repository 402 may include services tools 412A, 412B, and 412C, such as update services specific to various computer operating systems. The centralized patch repository 402 may be a local, centralized, on-premises computer service or computer-based storage system where patches, updates, and fixes for software are collected, managed, and distributed. In a cloud environment, patches, updates, and fixes for software are collected, managed, and distributed from a remote centralized patch repository 402 over a network. Service tools 412A, 412B, and 412C may facilitate the management and distribution of fixes or release patch data from the centralized patch repository 402. The centralized patch repository 402 and service tools 412A, 412B, and 412C may communicate over a network, such as a LAN, WAN, and/or a public network (e.g., the Internet), with the isolated computing environment 420 via gateway 410 and virtual network layer 405 including organization network gateways 430. In embodiments, communication between the centralized patch repository 402 and the isolated computing environment 420 may occur via public network interface cards (NIC) 404A, 404B, and 404C and private NICs 406A, 406B, and 406C correlating to service tools 412A, 412B, and 412C, in operable communication with public NICs 404D, 404E, and 404F and private NICs 406D, 406E, and 406F correlating to proxy tools 418A, 418B, and 418C.

In embodiments, the air-gapped system 96 of FIG. 3 comprises air-gap module 450 of FIG. 4 which may comprise one or more program modules such as program modules 42 described with respect to FIG. 1. The air-gapped system 96 of FIG. 3 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the air-gap module 450 is in operable communication with the centralized patch repository 402 to provide a first query instruction 422 to the centralized patch repository 402 for new patch data to update the proxy tools 418A, 418B, and 418C or other software. The air-gap module 450 may provide a first query instruction 422, such as via a query computer instruction (a command), to determine that the centralized patch repository 402 is functioning and/or contains new patch data. In embodiments, the first query instruction 422 may be an automated script including a plurality of computer instructions configured to query or determine that the centralized patch repository 402 is functioning and/or contains new patch data. In response to the first query 422, the centralized patch repository 402 may communicate a confirmation corresponding to the first query instruction 422 of new patch data availability. For example, the first query instruction 422 may query centralized patch repository 402 in response to new patch data being stored in the centralized patch repository 402. In response to the first query instruction, the centralized patch repository 402 may respond to the query confirming or denying that new patch data is present in the centralized patch repository 402. In this manner, the air-gap module 450 is configured to receive a confirmation from the centralized patch repository 402 of new patch data in the centralized patch repository 402.

In embodiments, the air-gap module 450 is in operable communication with the virtual network layer 405 of the isolated computing environment 420. The air-gap module 450 may provide a first instruction 424 to the virtual network layer 405 to enable or disable organizational network gateways 430, such as via program instructions. The organizational network gateways 430 may be tiered gateways. Tiered gateways may include network node arrangements that function as gates between computer networks. Data passing over networks must pass through gateways. Tiered gateways may include, for example, tier-0 gateways for connecting public networks to computing devices and tier-1 gateways for routing network traffic between clusters that host the same computer application. The organizational network gateways 430 may allow or prevent new patch data from the centralized patch repository 402 to be communicated to the patching layer 408 via network communication. The organizational network gateways 430 may prevent communication of new patch data to the patching layer 408 via firewall rules configured to block network communication with the centralized patch repository. Firewall rules may include network controls over traffic direction, source and destination identification, network protocols, port numbers, and rules and priorities. In this manner, the air-gap module 450 is configured to provide an enabled air-gap 460 of the isolated computing environment to receive the new patch data over a network. In embodiments, the enabled air-gap

460 uses firewall rules to isolate the proxy tools 418A, 418B, and 418C from the centralized patch repository 402.

In embodiments, the air-gap module 450 is in operable communication with a patching layer 408 of the isolated computing environment 420. The air-gap module 450 may provide a second instruction 426 to the isolated computing environment 420 to terminate, disable, or power-off proxy tools 418A, 418B, and 418C in response to the enabled air-gap 460 being active, thereby isolating the proxy tools 418A, 418B, and 418C from the centralized patch repository 402.

Figure 5:
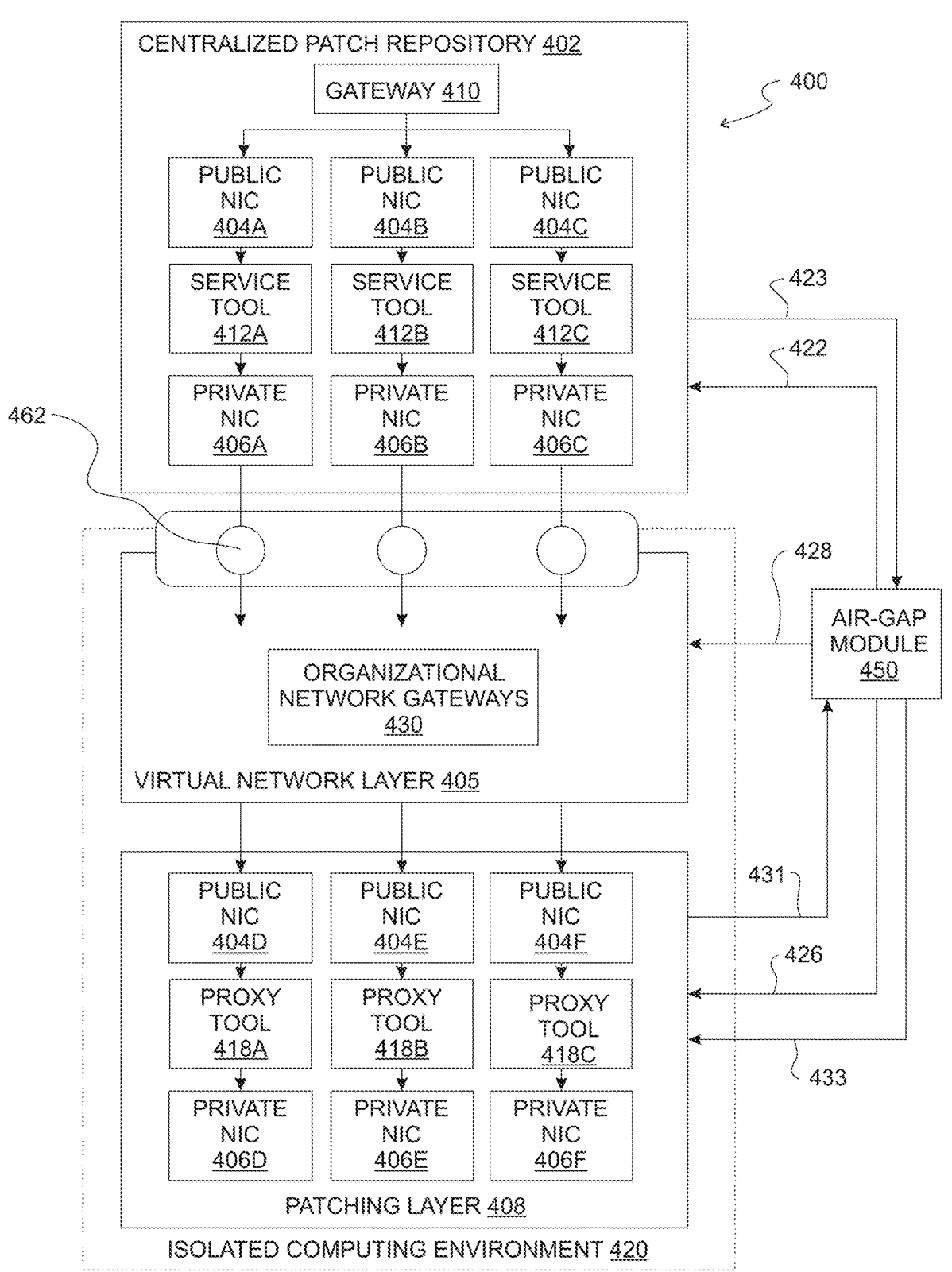
FIG. 5 shows a block diagram of an exemplary environment in accordance with aspects of the present invention.

FIG. 5 shows a block diagram of an exemplary environment 400 in accordance with aspects of the present invention in which an air-gap is disabled. The exemplary environment 400 may be a cloud-based environment or an on-premises environment, such as a data center. In embodiments, disabling the air-gap comprises implementing firewall rules configured to allow network communication with the centralized patch repository 402. In embodiments, environment 400 includes the centralized patch repository 402 in operable communication with the isolated computing environment 420. The centralized patch repository 402 may include services tools 412A, 412B, and 412C, such as update services specific to various computer operating systems. Service tools 412A, 412B, and 412C may facilitate the management and distribution of fixes or release patch data from the centralized patch repository 402. The centralized patch repository 402 and service tools 412A, 412B, and 412C may communicate over a network, such as a LAN, WAN, and/or a public network (e.g., the Internet), with the isolated computing environment 420 via gateway 410 and virtual network layer 405 including organization network gateways 430. In embodiments, communication between the centralized patch repository 402 and the isolated computing environment 420 may occur via public network interface cards (NIC) 404A, 404B, and 404C and private NICs 406A, 406B, and 406C correlating to service tools 412A, 412B, and 412C, in operable communication with public NICs 404D, 404E, and 404F and private NICs 406D, 406E, and 406F correlating to proxy tools 418A, 418B, and 418C.

In embodiments, the air-gap module 450 is in operable communication with the centralized patch repository 402 to provide the first query instruction 422 to the centralized patch repository 402 for new patch data to update the proxy tools 418A, 418B, and 418C or other software. The air-gap module 450 may provide the first query instruction 422 to the centralized patch repository 402 by establishing a network connection and interacting with the centralized patch repository 402, such as by program instructions. In embodiments, the first query instruction 422 may be an automated script. In response, the centralized patch repository 402 may communicate confirmation 423 of new patch data availability. In this manner, the air-gap module 450 is configured to receive the confirmation 423 of new patch data in the centralized patch repository 402. In response to the confirmation 423, the air-gap module 450 may instruct the isolated computing environment 420 to spin-up a proxy, such as proxy tools 418A, 418B, and 418C. In response to receiving the confirmation 423 of new patch data in the centralized patch repository 402, the air-gap module 450 may provide a third instruction 433 to the isolated computing environment 420 to spin-up a proxy, such as proxy tools 418A, 418B, and 418C and receive the new patch data via the patching layer 408.

In embodiments, the air-gap module 450 is in operable communication with the virtual network layer 405 of the isolated computing environment 420. The air-gap module 450 may provide a first instruction 424 to the virtual network layer 405 to disable organizational network gateways 430, such as via program instructions. The organizational network gateways 430 may allow new patch data from the centralized patch repository 402 to be communicated to the patching layer 408 via network communication. In embodiments, the patching layer 408 receives new patch data which may include the patching layer 408 downloading the new patch data from the centralized patch repository 402. The organizational network gateways 430 may facilitate communication of new patch data to the patching layer 408 via firewall rules configured to allow network communication with the centralized patch repository 402. In this manner, the air-gap module 450 is configured to provide a disabled air-gap 462 of the isolated computing environment 420. Further, the patching layer 408 is configured to receive the new patch data over a network. In embodiments, air-gap module 450 may also communicate a query instruction to the centralized patch repository 402 for success criteria, e.g., a message indicating a completed transfer of new patch data or data transfer metrics indicating that new patch data has been transferred completely. Further, in response to receiving confirmation 431 of success criteria, the air-gap module 450 may provide a third instruction 433 the virtual network layer 405 to re-enable 428 the air-gap. In this manner, the air-gap module 450 may query the centralized patch repository 402 for success criteria of receiving the new patch data and enable the air-gap based on the success criteria. Additionally, upon receiving the success criteria, the air-gap module 450 may provide a second instruction 426 to the isolated computing environment 420 to terminate, disable, or power-off proxy tools 418A, 418B, and 418C in response to the enabled air-gap 460 being active, thereby isolating the proxy tools 418A, 418B, and 418C from the centralized patch repository 402.

Figure 6:
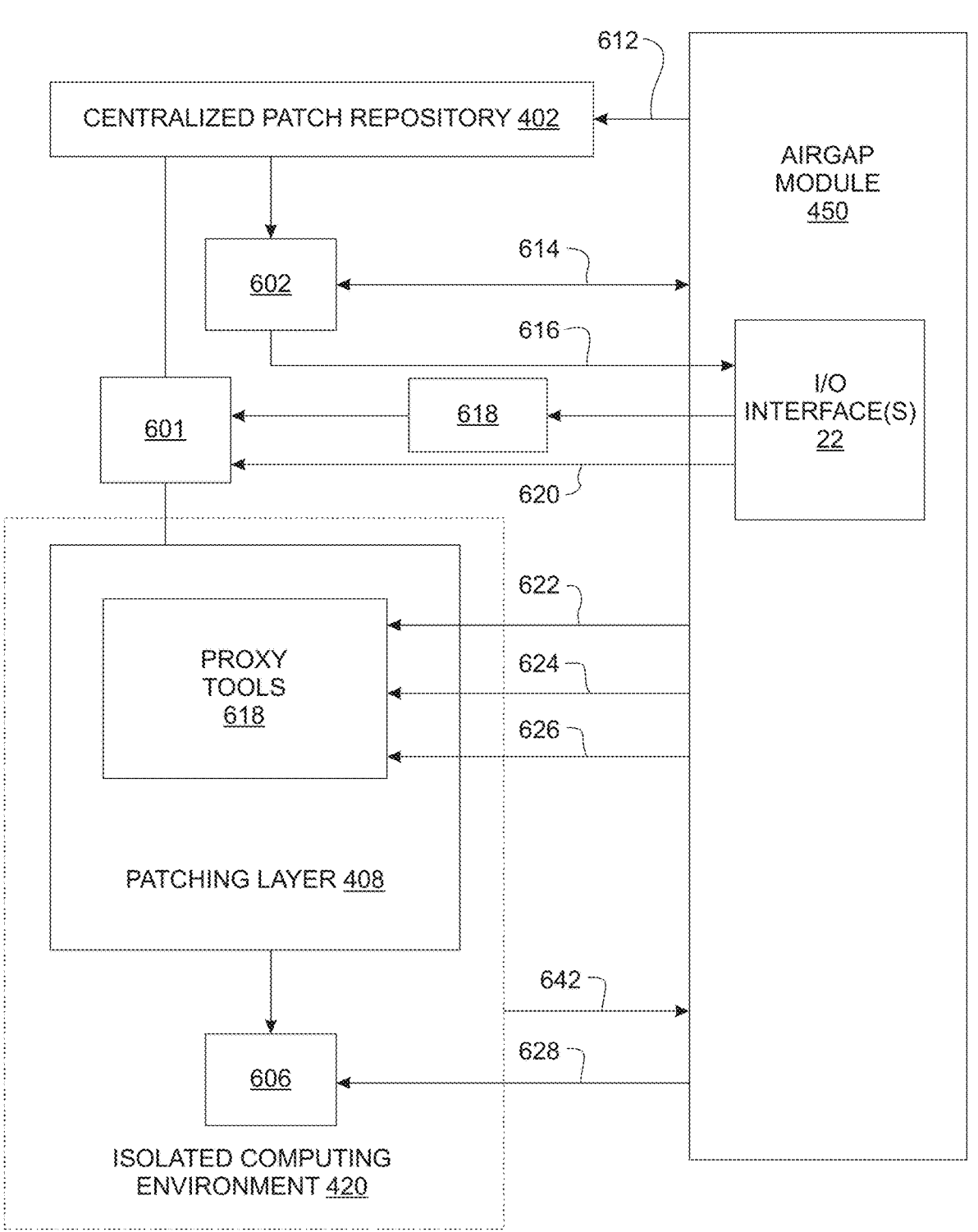
FIG. 6 shows a block diagram of an exemplary environment in accordance with aspects of the present invention.

FIG. 6 shows a block diagram of an exemplary environment in accordance with aspects of the present invention. The exemplary environment may be a cloud-based environment or an on-premises environment. The air-gap module 450 in FIG. 6 is the same as the air-gap module 450 of FIGS. 4 and 5. The air-gap module 450 may be in operable communication with the centralized patch repository 402 of FIGS. 4 and 5. The air-gap module 450 may query 612 the centralized patch repository 402 for new patch data 614. The centralized patch repository 402 may communicate confirmation 602 of new patch data 614 to the air-gap module 450. In embodiments, upon receiving the confirmation 602, the air-gap module 450 may automatically provide a fourth instruction 622 to the patching layer 408 of FIGS. 4 and 5 to spin-up a proxy in the isolated computing environment 420. In embodiments, confirmation 602 may be communicated 616 by the centralized patch repository 402 to I/O interfaces 22 of FIG. 1. Accordingly, the I/O interfaces 22 allows for a user input to manually enable or manually disable an air-gap 601 (which corresponds with enabled air-gap 460 of FIG. 4 and disabled air-gap 462 of FIG. 5). The air-gap module 601 may provide a fifth instruction 624 to the isolated computing environment 420 to terminate, disable, or power-off proxy tools 618, corresponding to proxy tools 418A, 418B, and 418C of FIGS. 4 and 5. The air-gap module 601 may provide the fifth instruction 624 to the isolated computing environment 420 to terminate, disable, or power-off proxy tools in response to the air-gap 601 being active, thereby isolating the proxy tools 618 from the centralized patch repository 402. The air-gap module 450 may also provide a second query instruction 626 to the centralized patch repository 402 for success criteria 606.

Further, in response to receiving confirmation 628 of success criteria, the air-gap module 450 may provide a sixth instruction 642 the patching layer 408 to re-enable the air-gap 601.

FIG. 7 shows a flowchart 700 of an exemplary environment in accordance with aspects of the present invention. In step 702, a system, a method, or a computer program product may query a centralized patch repository for new patch data via the air-gap module 450 of FIGS. 4, 5, and 6. In step 704, a system, a method, or a computer program product may receive a confirmation that there is new patch data in the central patch repository via the air-gap module 450 of FIGS. 4, 5, and 6. In step 706, a system, a method, or a computer program product may spin-up a proxy in an isolated computing environment in response to the receiving the confirmation via the air-gap module 450 of FIGS. 4, 5, and 6. Spinning-up or spinning-down of a proxy may include powering on/off or enabling/disabling proxies in an isolated environment. In step 708, a system, a method, or a computer program product may disable an air-gap, e.g., disabling gateway firewall policies of the isolated computing environment. In embodiments, the isolated computing environment is configured to receive the new patch data via the air-gap module 450 of FIGS. 4, 5, and 6 in response to the air-gap being disabled. In step 710, a system, a method, or a computer program product may receive the new patch data at the isolated computing environment from the centralized patch repository in response to the air-gap module being disabled (i.e., without the enabled air-gap module 450 of FIGS. 4, 5, and 6 preventing communication of the new patch data).

In embodiments, a service provider could offer to perform the processes described herein. In this case, the service provider can create, maintain, deploy, support, etc., the computer infrastructure that performs the process steps of the present invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the present invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

querying, by a computing device, a centralized patch repository for new patch data;

receiving, by the computing device, a confirmation that there is new patch data in the centralized patch repository;

spinning-up, by the computing device, a proxy in an isolated computing environment in response to the receiving the confirmation;

disabling, by the computing device, an air-gap of the isolated computing environment configured to receive the new patch data; and receiving, by the computing device, the new patch data at the isolated computing environment from the centralized patch repository.

2. The method of claim 1, further comprising:

querying, by the computing device, the centralized patch repository for a success criteria of the receiving the new patch data; and enabling, by the computing device, the air-gap based on the success criteria comprising enabling gateway firewall rules configured to block network communication with the centralized patch repository.

3. The method of claim 1, further comprising spinning-down the proxy based on a success criteria, wherein the spinning-down comprises powering off or disabling the proxy in the isolated environment.

4. The method of claim 1, wherein the spinning-up comprises powering on or enabling the proxy in the isolated environment.

5. The method of claim 1, wherein the air-gap comprises gateway firewall rules configured to block network communication with the centralized patch repository.

6. The method of claim 1, wherein the air-gap comprises a virtual network layer comprising tiered gateways configured to block network communication with the centralized patch repository.

7. The method of claim 1, wherein the air-gap is configured to prevent network communication between the proxy and the centralized patch repository in response to the air-gap being enabled and allow network communication between the proxy and the centralized patch repository in response to the air-gap being disabled.

8. The method of claim 1, wherein the centralized patch repository is external from the proxy.

9. The method of claim 1, wherein the computing device includes software provided as a service in a cloud environment.

10. A computer program product comprising one or more computer readable storage media having program instructions collectively stored on the one or more computer readable storage media, the program instructions executable to:

query a centralized patch repository for new patch data;

receive a confirmation that there is new patch data in the centralized patch repository;

spin-up a proxy in an isolated computing environment in response to the receiving the confirmation;

disable an air-gap of the isolated computing environment configured to receive the new patch data; and receive the new patch data at the isolated computing environment from the centralized patch repository.

11. The computer program product of claim 10, wherein the program instructions are further executable to:

query the centralized patch repository for a success criteria of the receiving the new patch data; and enable the air-gap based on the success criteria comprising enabling gateway firewall rules configured to block network communication with the centralized patch repository.

12. The computer program product of claim 10, wherein the program instructions are further executable to spin-down the proxy based on a success criteria, wherein the spinning-down comprises powering off or disabling the proxy in the isolated environment.

13. The computer program product of claim 10, wherein the spinning-up comprises powering on or enabling the proxy in the isolated environment.

14. The computer program product of claim 10, wherein the air-gap comprises gateway firewall rules configured to block network communication with the centralized patch repository.

15. The computer program product of claim 10, wherein the air-gap comprises a virtual network layer comprising tiered gateways configured to block network communication with the centralized patch repository.

16. The computer program product of claim 10, wherein the air-gap is configured to prevent network communication between the proxy and the centralized patch repository in response to the air-gap being enabled and allow network communication between the proxy and the centralized patch repository in response to the air-gap being disabled.

17. The computer program product of claim 10, wherein the air-gap is configured to allow network communication between the proxy and the centralized patch repository.

18. The computer program product of claim 10, wherein the centralized patch repository is external from the proxy.

19. The computer program product of claim 10, wherein the computing device includes software provided as a service in a cloud environment.

20. A system comprising:

a processor, a computer readable memory, one or more computer readable storage media, and program instructions collectively stored on the one or more computer readable storage media, the program instructions executable to:

query a centralized patch repository for new patch data;

receive a confirmation that there is new patch data in the centralized patch repository;

spin-up a proxy in an isolated computing environment in response to the receiving the confirmation;

disable an air-gap of the isolated computing environment configured to receive the new patch data; and receive the new patch data at the isolated computing environment from the centralized patch repository.

* * * * *